Figure 2:
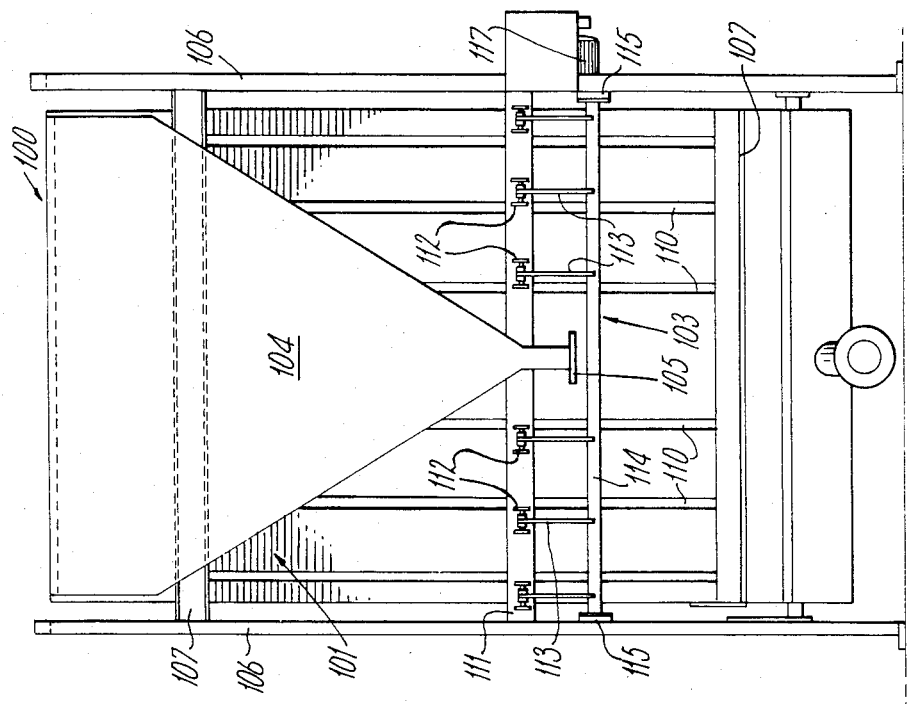

United States Patent [19]

Lees

[11] Patent Number: 4,505,812

[45] Date of Patent: Mar. 19, 1985

[54] SIEVE SCREEN DECK

[75] Inventor: Jeremy J. Lees, Sydney, Australia

[73] Assignee: Ilecard Pty. Limited, Sydney, Australia

[21] Appl. No.: 487,709

[22] Filed: Apr. 22, 1983

[30] Foreign Application Priority Data

Mar. 30, 1983 [AU] Australia .............................. 12997/83

[51] Int. Cl.³ ................................. B07B 1/34
[52] U.S. Cl. ..................... 209/275; 209/269; 209/395; 209/405; 209/346; 210/388
[58] Field of Search ......................... 209/365 A–365 C, 209/366, 382, 274, 275, 281, 359, 346–349, 283, 395, 405; 210/384, 389, 388, 409, 420, 495, 433.1

[56] References Cited

U.S. PATENT DOCUMENTS

| 923,108 | 5/1909 | Bell et al. .............................. 209/347 |
| 1,229,819 | 6/1917 | Sturtevant .......................... 209/347 |
| 1,621,564 | 3/1927 | Sturtevant .......................... 209/347 |
| 1,725,511 | 8/1929 | Flanagan ............................. 209/347 |
| 2,329,773 | 9/1943 | Leahy ................................... 209/347 |
| 3,070,230 | 12/1962 | Peterson ............................. 209/382 |
| 3,483,974 | 12/1969 | Pearsall .............................. 209/382 |
| 3,520,408 | 7/1970 | Schlebusch . |
| 3,706,376 | 12/1972 | Krause . |
| 3,796,311 | 3/1974 | Krause ................................ 209/347 |
| 3,815,740 | 6/1974 | Ginaven ............................. 209/281 |
| 3,954,604 | 5/1976 | Krause et al. . |
| 3,989,621 | 11/1976 | Breudigam . |
| 4,146,483 | 3/1979 | Lee . |
| 4,147,114 | 4/1979 | Holmes . |

Primary Examiner—Frank W. Lutter
Assistant Examiner—William Bond
Attorney, Agent, or Firm—Holman & Stern

[57] ABSTRACT

A sieve screen deck, the screen of which comprises a plurality of horizontal wedge wires connected to an array of backing bars running longitudinally of the screen parallel to its fall line. The screen is connected to a frame at its two ends, at least one end being connected by resilient means such that the screen may vibrate and flex under the influence of rapping or vibrating means. Side walls are provided along sides of the sieve screen, to prevent material flowing over sides of the screen, are also formed of a resilient material in order that they do not substantially impede the ability of the sieve screen to vibrate and flex under the influence of the rapping or vibrating means.

4 Claims, 2 Drawing Figures

U.S. Patent   Mar. 19, 1985   4,505,812

SIEVE SCREEN DECK

The present invention relates to a sieve screen deck and more particularly to such a sieve screen deck having a self supporting sieve screen with side walls which sieve screen may be vibrated over substantially its whole surface.

Screen decks are used to separate liquids from a wide range of solid particulate matter and to separate fines from flowable streams of particulate matter. A slurry or a mixture of particles is flowed onto the upper end of the screen deck. As the mixture flows down a sieve screen in the deck the liquid or fines fall through the apertures in the sieve screen. In conventional screen decks the sieve screen is rigidly connected to a frame around its full periphery. In a planar screen this is usually done by clamping the sieve screen around its edges to the screen while in the case of a curved sieve screen, i.e. a sieve bend, the curved edges are supported and stiffly held in place by radius bows which are generally wedged in place of firmly located by springs.

It has been found in certain situations that the sieving action of such a screen deck may be enhanced by vibrating the screen or by rapping the screen i.e. by applying repeated impacts to one face of the screen or to the screen frame. Rapping is normally done by connecting a rapping bar to the underside of the sieve screen and positioning on the frame, or on the ground beneath the frame a mechanical impacting means which imparts blows in rapid succession to the rapping bar or by vibrating the complete screen and holding frame. The application of the rapping or vibrating force to a curved sieve screen which is rigidly held around its sides to a frame results in only a small part of the sieve screen actually moving.

It has been known to vibrate sieve screens formed of a fabric which is not self supporting. The fabric is held in a state of tension by being ridigly connected to a surrounding frame at its ends but not its sides. In this arrangement the application of a vibrational force to sieve screens of this type has not prevented blinding of the screen with fine particulate matter. It is believed this deficiency arises due to the nature of the apertures in the woven fabric sieve and due to the poor transmission of the vibrational forces throughout the screen due to its inherently non-rigid, i.e. non self supporting, nature.

The present invention consists in a sieve screen deck, comprising a self supporting sieve screen having two opposed end edges, rapping or vibrating means to cause the sieve screen to vibrate, and a frame to which the sieve screen is connected, the sieve screen including sieving means defining a plurality of substantially parallel narrow slots and an array of backing bars connected to the sieving means which render the sieve screen self supporting, the sieve screen being connected to the frame only at or adjacent its two end edges and at least one of the connections being through a resilient bush or like means allowing limited vibrational movement between the sieve screen and the frames, a side wall being provided substantially along the full length on each side of the sieve screen between its end edges so as to prevent material which is passing across the sieve screen between the two end edges from flowing over an edge of the sieve screen intermediate the said end edges, each side wall being formed of a resilient synthetic plastics material or rubber such that they do not impede substantially the ability of the sieve screen to vibrate and flex under the influence of the rapping or vibrating means.

Side walls to prevent material failing over the side edges of the sieve screen may be formed of a suitable synthetic plastics material or the like and connected to the side edges of the sieve screen. The plastics material should have sufficient resilience that the vibration of the sieve screen is not substantially impeded. In a preferred embodiment of the invention the side walls are cast in-situ on the side edges of the sieve screen. In other embodiments they may be clipped on, screwed on or attached in any other suitable manner. It has been found suitable to form the side walls of a polyurethane material which may be cast in-situ or formed separately and attached.

It is believed that the provision of flexible cast in-situ side walls on the self supporting but flexible sieve screen prevents material flowing over the edges of the screen without imparing the ability of the screen to vibrate and flex. It is believed that the freedom of the sieve screen to not only vibrate relative to its supporting frame but to also flex makes an important contribution to the efficiency of the seive screen.

The sieve screen is preferably formed of a parallel array of wedge wires lying at right angles to the slope of the screen. The wedge wires are preferably connected to an array of backing bars running longitudinally of the screen parallel to its fall line. A rapping or vibrating means is preferably connected to the backing bars parallel to the wedge wires. The screen may be planar or may curve along its length to form a sieve bend.

In an alternative embodiment have sieve screen comprises a sheet of metal into which an array of slots has been etched or otherwise formed. In this embodiment the sheet may be inherently self supporting or it may be supported by backing bars as described above.

The sieve screen is preferably formed with slots having a width of from 10 microns to 4 mm, most preferably the slots have a width of from 100 microns to 1 mm.

The frame of the sieve screen deck is of conventional construction subject to the fact that the screen is only connected along its end edges to the frame. The frame may be welded up from steel or formed in any other suitable manner. In one embodiment of the invention the frame may completely surround the sieve screen however in other embodiments a plurality of sieve screens may be disposed in side by side array with a single frame supporting all of them in which case each sieve screen is not individually surrounded by the frames.

The sieve screen is connected at or adjacent its end edges to the frame. One or both of the ends of the sieve screen are connected to the frame through resilient bushes or like means which allow a limited amount of vibrational movement between the sieve screen and the frame. In a typical situation the bushes might allow a maximum movement of the sieve screen relative to the frames of 2 or 3 mm, as compared with a maximum amplitude of vibration of the sieve screen of 5 mm. If desired one end of the sieve screen may be rigidly connected to the frame. If the sieve screen is curved it may be deisrable to provide adjustable connection means on the frame to attach the sieve screen to the frame. This is due to the fact that the exact curvature varies slightly between screens of the same nominal dimensions.

In one embodiment of the invention the impact means may be mounted directly onto a rapping bar and be pivotally connected thereto. This arrangement allows greater control to be effected over the vibrations of the sieve screen which can substantially alter the sieving action of the sieve screen deck. The impact means preferably comprises a double acting pneumatic ram having a lug at one end which may be bolted to a corresponding double clevis on the rapping bar. The angle of impact of the piston within the pneumatic ram may be varied by loosening the bolt connecting the ram to the rapping bar and rotating the penumatic ram about the axis of the bolt. If desired the magnitude of the rapping force may be varied by adding weights to the free end of the piston rod projecting from the pneumatic ram. While a ram as described is the preferred method of applying a rapping force to the sieve screens according to this invention other mechanisms such as electric motors carrying eccentric weights or solenoid rappers could be used.

In another embodiment of the invention vibration of the sieve screen is brought about by the oscillation of a vibration bar connected to the underside of the sieve screen across its free width intermediate its ends. The vibration bar is pivotally connected to one end of each one of an array of fingers which are rigidly connected at their other end to, and extend radially from, a rod which is caused to reciprocate about its longitudinal axis by the action of a motor rotating an eccentric which actuates a further arm extending radially from the rod.

Figure 1:
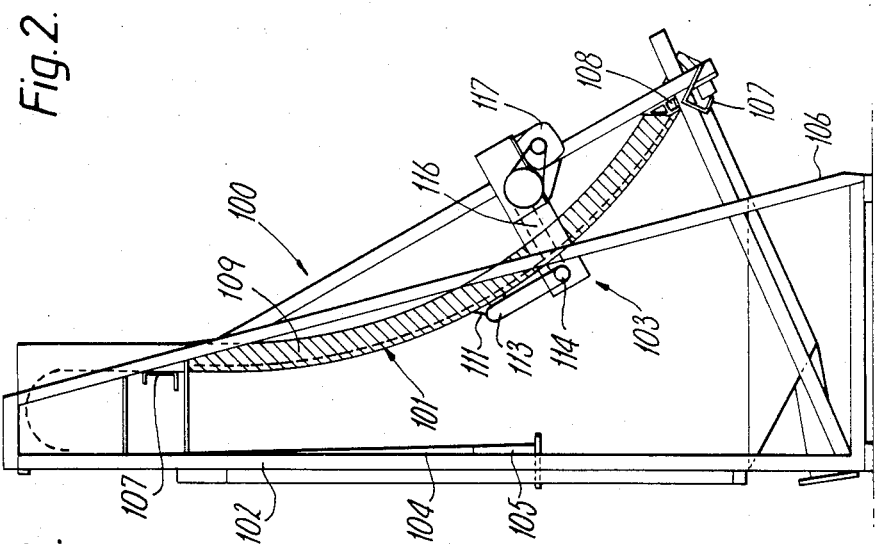

Hereinafter given by way of example only is a preferred embodiment of the present invention described with reference to the accompanying drawing in which:

FIG. 1 is a side elevational view of a sieve screen deck according to this invention; and FIG. 2 is a rear elevational view of the sieve screen deck of FIG. 1.

As seen in FIGS. 1 and 2 the sieve screen deck 100 comprises a curved sieve screen 101 mounted in a frame 102 and a vibrating means 103.

The frame 102 includes a distribution box 104 on its rear side, which serves to distribute an incoming slurry entering the sieve screen deck 100 through inlet 105 evenly across the width of the sieve screen 101, a pair of side frame members 106 and transverse frame members 107. The sieve screen 101 is formed of a large number of horizontal wedge bars connected to an array of backing bars 110. The screen 101 is bolted at its upper end to an upper transverse frame member 107 while at its lower end the screen is connected to a lower transverse frame member 107 through rubber bushes 108.

The sieve screen 101 is formed on either side with a flexible side wall 109 which is cast in-situ on the sieve screen 101 from a flexible polyurethane resin. These side walls serve to prevent material being passed across the sieve screen 101 from flowing off the sides thereof intermediate its ends.

A vibration bar 111 is connected to the backing bars 110 across the full width of the sieve screen 101. A plurality of U-shaped saddles 112 are connected to the rear surface of the vibration bar 111. Each saddle 112 is pivotally conencted to the face end of one of a plurality of fingers 113 which are welded to extend radially from a rod 114. The rod 114 extends transversely across the sieve screen deck 100 and is supported at either end by a bearing 115 such that it may rotationally oscillate about its longitudinal axis. A further arm 116 extends radially from rod 115 and at its free end has a bush which surrounds an eccentric cam (not shown) driven by motor 117 which is mounted on frame 102.

In use a slurry or like feedstock is fed into the distribution bar 104 through inlet 105 and flows evenly onto sieve screen 101. As the slurry flows down the sieve screen 101 the screen 101 is caused to vibrate due to the motor driven eccentric causing the rod 114 to rotationally oscillate which in turn causes the vibration bar 111 to vibrate. It has been found that the vibrations applied to the sieve screen 101 are transmitted throughout the screen due to the manner in which it is mounted and due to its semi-rigid, self supporting nature. The sieve screen deck 100 has been found to be substantially less susceptible to blinding than any of the conventional sieve screen decks described in the preamble to this specification.

I claim:

1. A sieve screen deck, comprising a sloping, self supporting sieve screen having two opposed end edges, rapping or vibrating means to cause the sieve screen to vibrate, and a frame to which the sieve screen is connected, the sieve screen including sieving means defining a plurality of substantially parallel narrow slots and an array of backing bars connected to the sieve means which render the sieve screen self supporting, the sieve screen being connected to the frame only at or adjacent its two end edges and at least one of the connections being through a resilient means allowing limited vibrational movement between the sieve screen and the frame, a side wall being provided substantially along the full length on each side of the sieve screen spaced from and free of contact with the frame along the full length of the side walls and being of such a height so as to prevent material which is passing across the sieve screen between the two end edges from flowing over an edge of the sieve screen intermediate the said end edges. each side wall being formed of a resilient synthetic plastics material or rubber such that they do not impede substantially the ability of the sieve screen to vibrate and flex under the influence of the rapping or vibrating means.

2. The sieve screen deck as claimed in claim 1 in which the sieve screen is curved along its length.

3. The sieve screen deck as claimed in claim 1 in which the side walls are cast in-situ on the sieve screen deck.

4. The sieve screen deck as claimed in claim 1 in which the rapping or vibrating means comprises a vibration bar connected to the underside of the sieve screen across the full width thereof intermediate the end edges thereof, the vibration bar being pivotally connected to the free ends of a plurality of arms extending radially from a rod, means being provided to cause the rod to oscillate about its longitudinal axis.

* * * * *